July 9, 1957 D. E. CATLIN 2,798,449
LOW PRESSURE INDICATOR FOR TIRES
Filed Oct. 5, 1955

Dick E. Catlin
INVENTOR.

BY *Clarence A. O'Brien*
*and Harvey B. Jacobson*
Attorneys

United States Patent Office 2,798,449
Patented July 9, 1957

2,798,449

LOW PRESSURE INDICATOR FOR TIRES

Dick E. Catlin, Manzanola, Colo.

Application October 5, 1955, Serial No. 538,611

3 Claims. (Cl. 116—34)

The present invention relates to new and useful improvements in tire pressure indicators embodying a mechanism which acts to explode a cartridge when tire pressure falls below a predetermined point.

An important object of the invention is to provide a casting adapted for attaching to a vehicle wheel rim and in which a cartridge chamber is formed to receive a blank cartridge and behind which a hammer is slidable and released for striking and firing the cartridge should the pressure in the tire drop below a predetermined point to warn the driver of the vehicle of the deflated condition of the tire.

Another object of the invention is to provide the casting with a removable plug in which the cartridge chamber is formed to facilitate reloading the mechanism.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
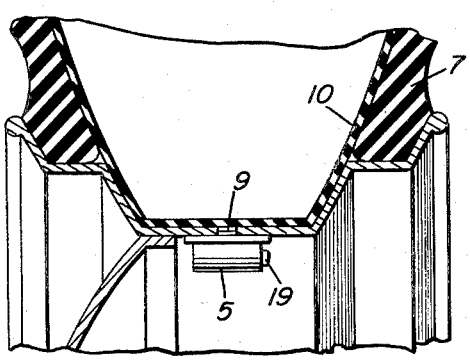
Figure 1 is a fragmentary sectional view of a pneumatic tire and wheel rim showing the low pressure indicator mounted thereon.
Figure 2:
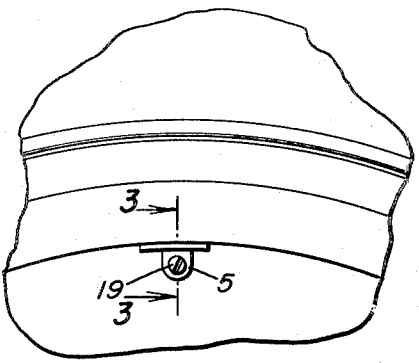
Figure 2 is a fragmentary side elevational view of the tire rim and showing the low pressure indicator in end elevation.

Referring now to the drawing in detail, wherein for the purpose of illustration I have disclosed a preferred embodiment of the invention, the numeral 5 designates a casting adapted for attaching to a vehicle rim 6 on which a pneumatic tire 7 is mounted. The tire rim 6 is formed with an opening 8 to accommodate a plunger 9 positioned in contact with the inflatable tube 10 of the tire. The plunger 9 is slidable in a recess 11 in the casting 5 and a coil spring 12 is positioned in the recess behind the plunger to hold the latter in contact with the tire tube 10.

The plunger 9 is formed with a stem 13 which projects into a barrel 14 formed in the casing 5. A hammer 15 is slidable in the barrel 14 and behind which a coil spring 16 is positioned to project the hammer toward a blank cartridge 17 which is inserted in a cartridge chamber 18 formed at the inner end of a hollow plug 19 which is threaded into one end of the barrel 14. The outer end of the plug 19 is open as shown at 20 to permit escape of the explosive charge. The front end of the hammer 14 is formed with a firing pin 21 to effectively fire the cartridge.

Figure 3:
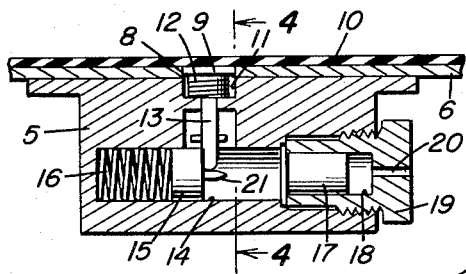
Figure 3 is an enlarged sectional view taken on a line 3—3 of Figure 2.
Figure 4:
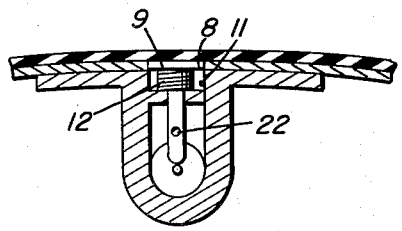
Figure 4 is a transverse sectional view taken on a line 4—4 of Figure 3.

In the operation of the device the air pressure in the tire tube 10 forces the plunger 9 in a direction to position the stem 13 in the path of firing movement of the hammer 15 to provide a catch for retaining the hammer in a cocked or non-firing position, as indicated in Figure 3 of the drawing. Should the pressure in the tire drop or become deflated the spring 12 behind the plunger 9 will retract the stem 13 from the barrel 14 and release the hammer 15 whereupon the spring 16 will move the hammer in a direction to fire the cartridge 17 and thus warn the driver of the deflated condition of the tire.

The stem 13 is formed with a cross pin 22 to retain the plunger 9 in the casting 5 when the tire 7 has been removed for repairing the same.

Figure 5:
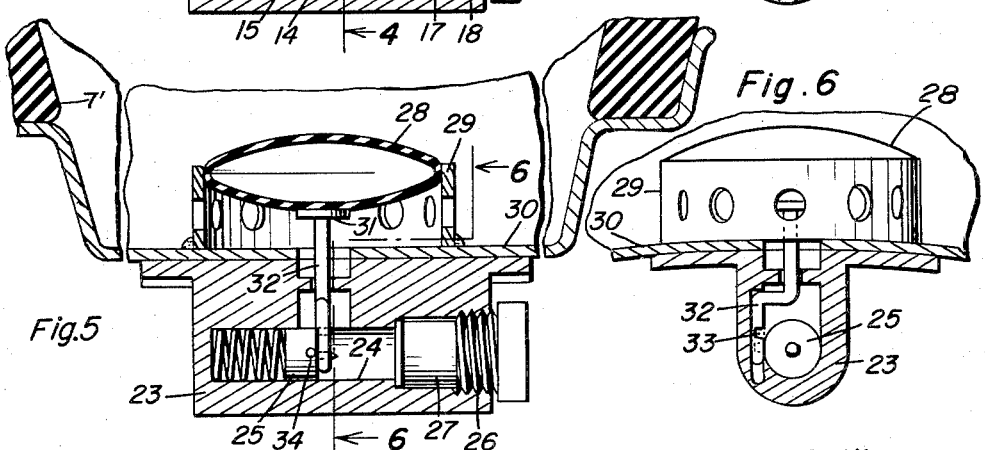
Figure 5 is a fragmentary sectional view of a modified construction for use with tubeless tires.
Figure 6:
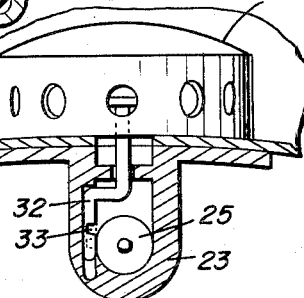
Figure 6 is a transverse sectional view taken on a line 6—6 of Figure 5.

Figures 5 and 6 illustrate the invention constructed for use with a tubeless time 7' and shows the casting at 23 having the bore or barrel 24 in which the spring loaded hammer 25 and plug 26 for the cartridge 27 are positioned in the arrangement heretofore described.

A closed sack, or envelope, 28 of resilient expansible and contractible material is cemented or otherwise suitably secured in a ring 29 which is welded to the inside of a tire rim 30 and a plunger 31 is cemented to the underside of the sack. A catch rod 32 extends from the plunger slidably in the casting and with the rod formed with a transverse slot 33 adapted to register with a pin 34 which projects outwardly at one side of the hammer 25.

The sack is shown in its normally contracted position by air pressure in the tire 7' to maintain the rod 32 in a position with the slot 33 out of alignment with pin 34 of the hammer to retain the hammer cocked or in non-firing position. A reduction of air pressure in the tire 7' will permit the sack 28 to expand and push the catch rod 32 in a direction to align the slot 33 with the pin 34 and release the hammer for firing the cartridge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire pressure indicator comprising a casting having a bore formed with a cartridge chamber at one end, a spring actuated hammer slidable in the bore to fire a cartridge in the chamber, catch means engaging and retaining the hammer in cocked position and disengageable therefrom to release the same, and a closed expansible and contractible sack responsive to air pressure in a tire for expanding and contracting movement and operatively connected to the catch means to disengage said catch means and release the hammer in response to expanding movement of said sack.

2. A tire pressure indicator comprising a casting supported on a rim on which an inflatable tire is mounted, said casting having a spring actuated cartridge firing mechanism mounted therein, and catch means engaging and holding said firing mechanism inactive, said catch means comprising a closed sack enclosed in the tire and actuated in an expanding and contracting movement in response to variations in air pressure in the tire, and means releasably connecting the sack to the firing mechanism to control actuation of the latter and operative in response to expanding movement of said sack to release the firing mechanism.

3. A tire pressure indicator comprising a casting supported on a rim on which an inflatable tire is mounted, said casting having a spring actuated cartridge firing mechanism mounted therein, and catch means engaging and holding said firing mechanism inactive, said catch means comprising a closed sack enclosed in the tire and actuated in an expanding and contracting movement in response to variations in air pressure in the tire, a ring supporting said sack therein and secured to the rim, said firing mechanism including a plunger, and a member connected to the sack and disposed in the path of firing movement of the plunger to release the latter in response to expanding movement of said sack.

References Cited in the file of this patent

UNITED STATES PATENTS 1,061,184  Knies  May 6, 1913